March 16, 1954  G. D. WIDMAN  2,672,107
FASTENER FOR CORRUGATED METAL ROOFING AND SIDING
Filed Dec. 20, 1948
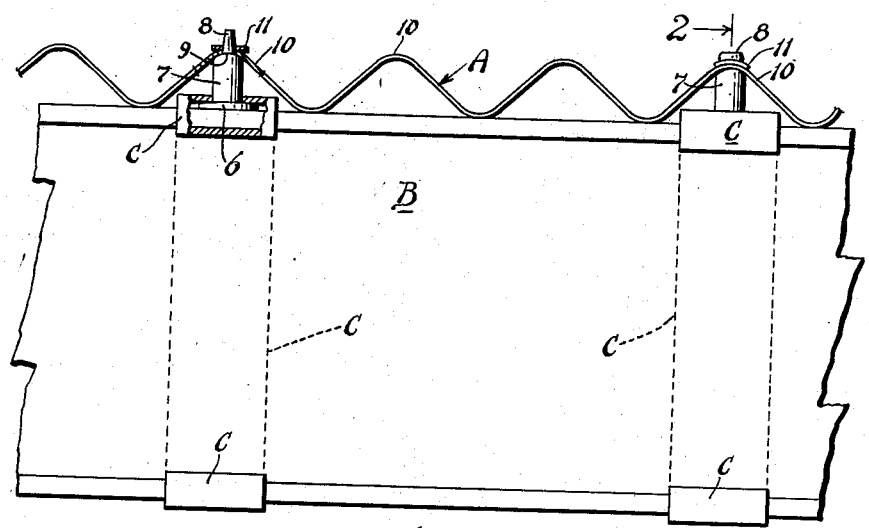
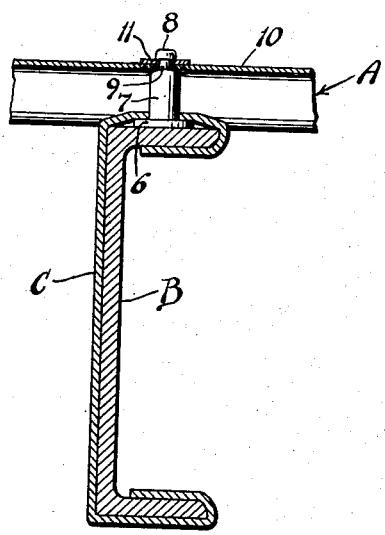
Fig.2
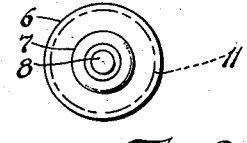
Fig.3
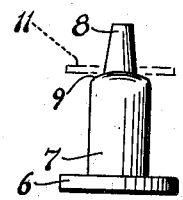
Fig.4
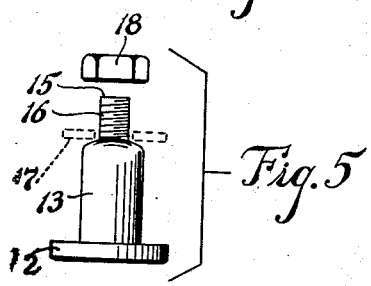
Fig.5
Inventor,
George D. Widman
By R. S. Berry
Attorney.

Patented Mar. 16, 1954

2,672,107

UNITED STATES PATENT OFFICE 2,672,107

FASTENER FOR CORRUGATED METAL ROOFING AND SIDING

George D. Widman, Gardena, Calif.

Application December 20, 1948, Serial No. 66,367

3 Claims. (Cl. 108—33)

This invention has for its primary purpose the provision of a new and highly efficient fastening means for securing in place the corrugated metal sheets employed in the construction of roofs, walls and the like, which fastening means constitutes an improvement over fasteners heretofore used, in point of the comparative simplicity and compactness thereof, its water tight qualities and provision for a reliable and secure fastening of sheets with such exact spacing that portions of the sheets will rest on the structural members to which the sheets are attached, while other portions of the sheets are secured to the fastening means without causing appreciable deformation of the corrugations, and in consideration of the comparative ease of the application of the fastening means without requiring the use of scaffolding under the roofs.

Another purpose is to provide as one embodiment of the present invention a fastener in which an integral portion thereof projecting from a rounded shoulder formed intermediate the ends of the fastener, constitutes a rivet which after being forced through the corrugated sheet and having a washer placed thereon, may be riveted so that the washer will clamp the sheet against the shoulder and effect a most secure and tight fastening of the sheet without undue deformation thereof and consequent leakage.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is an elevational view partly in section showing two fasteners of this invention as when applied, with one of the fasteners in position prior to being riveted and the other as it would appear after being riveted.

Fig. 2 is a sectional view taken on the line 2—2 of Fig. 1.

Fig. 3 is a top plan view of the fastening element of this invention.

Fig. 4 is a side elevational view of the fastening element.

Fig. 5 is an exploded view of a modified form of the fastening elements.

As shown in the accompanying drawing one embodiment of my invention comprises a rivet-type fastener which is made up of a flat head 6, a cylindrical shank portion 7 and a reduced and tapered rivet portion 8, which latter, as here shown, is equal to about one-third the length of the fastener but may be varied as to size as desired. At the juncture of the shank 7 and rivet portion 8 is an annular and rounded shoulder 9 which is radially curved throughout on a radius substantially equal to that of the underside of the transversely curved top portions of the corrugations 10 of corrugated metal sheeting A; the shoulder 9 leading abruptly radially outward from the base of the rivet portion.

With reference to Figs. 1 and 2 it is seen that each fastener as used to secure the corrugated sheeting A in place on a structural member such as the channel member B here shown, may be readily and easily mounted and held in place on such member without requiring use of scaffolding. This attachment of each fastener to the members B is provided for by means of a bendable metal strap C which has an opening D therein in which the shank 7 of the fastener is received, said strap being bent around the member B to clamp the head 6 on the member B as best shown in Fig. 2. The fastener is symmetrical about its axis and is therefore bounded by a surface of revolution.

The corrugated sheeting A is laid over the fasteners so that the rivet end 8 of each fastener is against the inner side of the top portion of the particular corrugation 10 to be penetrated, and upon now striking this corrugation with a rubber mallet (not shown) the rivet end will be forced through the corrugation and exposed on the exterior thereof as shown on the left side of Fig. 1 while the inside surface of the ridge or top of the corrugation will rest on the curved, dome-shaped shoulder 9. The dimensions of the fastener are such that the bottoms of the valleys or low points of the corrugations will rest firmly on the structural member as shown in Fig. 2 to add stability to the assembly. By forming the shank portion 7 with the annular rounded shoulder 9 having a radius substantially equal to the transverse curvature of the underside of the corrugation, such shoulder will conform to the underside of the corrugation laterally thereof irrespective of the position of the shank portion 7 around its axis relative to the strap C, thus obviating any necessity of aligning the fastener to present a particular side thereof in the direction of the length of the corrugation as occurs where the shoulder is rounded or curved in only one direction. This is particularly advantageous where the fastener is concealed beneath the sheet A when applied thereover, since the workman is above or on the outer side of the sheet A and can not see the fastener nor can he reach it to align it. The annular curved shoulder 9 in effect renders the fastener self-aligning.

A bendable washer 11 is placed on the exposed rivet portion 8 of each fastener and the rivet portion is then hammered and riveted so that the washer is forced tightly inward on the tapered base part of the rivet portion as shown in Figs. 1 and 2. The riveting is effected in such manner that the washer 11 is curved or bent only in a direction transversely of the corrugations 10 in conformity with the curvature of said corrugations. This transverse curvature is limited to that of the curved shoulder 9 which substantially follows the curvature of the corrugations. As a result of this arrangement stronger and tighter joints are provided and better seals are provided assuring prevention of leakage. Fig. 2 shows how a secure and leakproof fastening is effected without deformation of the corrugations. This is an important feature of the invention since deformation of the corrugated sheet metal disrupts the surface finish thereof such as to render the underlying metallic body subject to corrosion and eventual dissolution so as to develop leaks and also loosen the connection of the sheet with the rivet.

As shown in Fig. 5, a modified form of my invention comprises a head 12, shank 13 and rounded shoulder 14 corresponding to like parts in the rivet-type fastener, but wherein the reduced end portion 15 is screw-threaded as at 16 instead of being formed as a rivet portion and is adapted to receive a washer 17 (shown in dotted lines) and a nut 18. Substantially the same effect as riveting is obtained when the nut 18 is tightened after the fastener is arranged in the manner shown in the left side of Fig. 1, ready to have the washer and nut applied. As in the preferred form the curve of the annular, dome-shaped shoulder meets the surface of the reduced end portion at an obtuse angle as best seen in Figures 4 and 5.

It will now be apparent that the fastening means of this invention will eliminate the cost of scaffolding under the roofs and increases the security of attachment of the corrugated sheeting and control of leakage, also allows purlins to which the fasteners and the strips are secured to be faced up or down.

I claim:

1. A roofing joint comprising a channel-shaped purlin, a corrugated roofing sheet with the bottom surfaces of its valleys resting upon one flange of the purlin, a clamping strap transversely surrounding the major portion of the purlin and positioned under a ridge of the corrugated sheet centrally between two proximate valleys, a one-piece fastening member resting upon said flange of the purlin, and held in place by said strap, said one-piece fastening member having a neck extending snugly through a hole in the ridge and an annular curved shoulder surrounding the neck and engaging the roofing sheet, the curve of the engaging surfaces of the shoulder and the inside of the ridge being smooth and substantially identical to afford the sheet maximum support in a line transverse to the length of the ridge, a washer of soft metal surrounding the neck above the roofing sheet and conforming with the curve of the outer surface of the ridge, and a rivet head forming a portion of the one-piece fastening member firmly holding the ridge between the curved supporting shoulder and the washer, whereby the ridge is supported from the purlin by a solid piece of relatively unyielding metal anchored in place on the purlin, thus avoiding the tendency of the roof to move under pressure from above which would enlarge the hole through which the rivet neck extends.

2. A fastener for securing a corrugated roofing sheet to a purlin comprising a cylindrical shank, a head on one end of the shank and integral therewith, a coaxial penetrating member at the other end of the shank and integral therewith, said member being smaller in diameter than the shank, thus forming an annular and rounded shoulder to support a roofing sheet, said shoulder meeting the member at an angle greater than 90°.

3. A device for fastening sheets of corrugated metal roofing having alternate ridges and valleys to a supporting structural framework including rolled channels forming purlins, comprising: a bendable metal clamping strap to engage the back and both the outside and the inside surfaces of both of the flanges of the channel and having a hole therein near one end, a one-piece fastener member of metal of sufficient strength to penetrate the sheet by a rubber mallet blow, fitting the hole in the strap in position to be located centrally of the outer surface of either channel flange as may be desired, said fastener member including a flat head engaging the strap and resting upon the channel flange, a shank portion engaging the hole and an outwardly tapered conical rivet portion, the base of which rivet portion is smaller in diameter than the diameter of the shank to form a dome-shaped annular shoulder, said shoulder having a surface of revolution curved to fit the inside curved surface of a ridge of a selected sheet to be fastened, and the length of the shank being chosen so that when a chosen ridge of the sheet is seated on the curved shoulder, the inner corrugations or bottom surfaces of the valleys rest upon the channel flange, whereby the shoulder having a surface of revolution, is self alining and turned at any angle about its axis snugly fits the curve of the corrugation of the metal sheet, and because of its relative unyielding nature, supports the sheet against pressure from above.

GEORGE D. WIDMAN.

References Cited in the file of this patent

UNITED STATES PATENTS

| Number | Name | Date |
|---|---|---|
| 1,227,666 | Rau | May 29, 1917 |
| 1,548,061 | Pfeifer | Aug. 4, 1925 |
| 1,930,187 | Abronski | Oct. 10, 1933 |
| 2,014,451 | Pfeifer | Sept. 17, 1935 |

FOREIGN PATENTS

| Number | Country | Date |
|---|---|---|
| 365,916 | Great Britain | Jan. 28, 1932 |